United States Patent [19]

Lang et al.

[11] Patent Number: 5,509,493
[45] Date of Patent: Apr. 23, 1996

[54] CONTROL DEVICE FOR STEERING-RACK EQUIPPED AUXILIARY POWER STEERING

[75] Inventors: Armin Lang, Schwäbisch Gmünd; Helmut Knödler, Lorch, both of Germany

[73] Assignee: ZF Friedrichshafen AG, Germany

[21] Appl. No.: 284,493

[22] PCT Filed: Feb. 4, 1993

[86] PCT No.: PCT/EP93/00248

§ 371 Date: Aug. 5, 1994

§ 102(e) Date: Aug. 5, 1994

[87] PCT Pub. No.: WO93/15947

PCT Pub. Date: Aug. 19, 1993

[30] Foreign Application Priority Data

Feb. 6, 1992 [DE] Germany .................. 42 03 335.7

[51] Int. Cl.⁶ .................................................. B62D 5/22
[52] U.S. Cl. ........................... 180/132; 180/141; 180/148
[58] Field of Search ...................... 180/132, 141, 180/142, 79, 79.1, 79.3, 148, 149

[56] References Cited

U.S. PATENT DOCUMENTS

| | | | |
|---|---|---|---|
| 4,607,717 | 8/1986 | Nakayama | 180/141 |
| 4,779,694 | 10/1988 | Adams | 180/148 |
| 4,834,202 | 5/1989 | Shimizu | 180/79.1 |

FOREIGN PATENT DOCUMENTS

| | | | |
|---|---|---|---|
| 75267 | 6/1981 | Japan | 180/79.1 |
| 114062 | 4/1990 | Japan | 180/79.1 |
| 2185223 | 7/1987 | United Kingdom | 180/79.1 |

Primary Examiner—Mitchell J. Hill
Attorney, Agent, or Firm—Larson & Taylor

[57] ABSTRACT

In a steering-rack-equipped auxiliary power steering which is intended particularly for motor vehicles, a pinion (2), positioned in a steering housing (1), engages a steering rack (6). A servomotor (11) is operationally connected with steering rack (6) for auxiliary power support. Pinion (2) is positioned swingably in a fixed bearing (3) and a loose bearing (4). In the area of loose bearing (4), there are arranged two control valves (26, 27) whose axes are essentially perpendicular to the axis of pinion (2). Loose bearing (4) is guided in a movable fashion in steering housing (1), perpendicularly with respect to its axis only in the direction of the axes of the two control valves (26, 27). In this steering-rack-equipped auxiliary power steering, one can make sure that to activate the control valves, one will not use the axial forces that act upon pinion (2) but rather the lateral forces. As a result, the activation of the control valves is independent of the helix angle or slope angle of the pinion gearing.

6 Claims, 1 Drawing Sheet

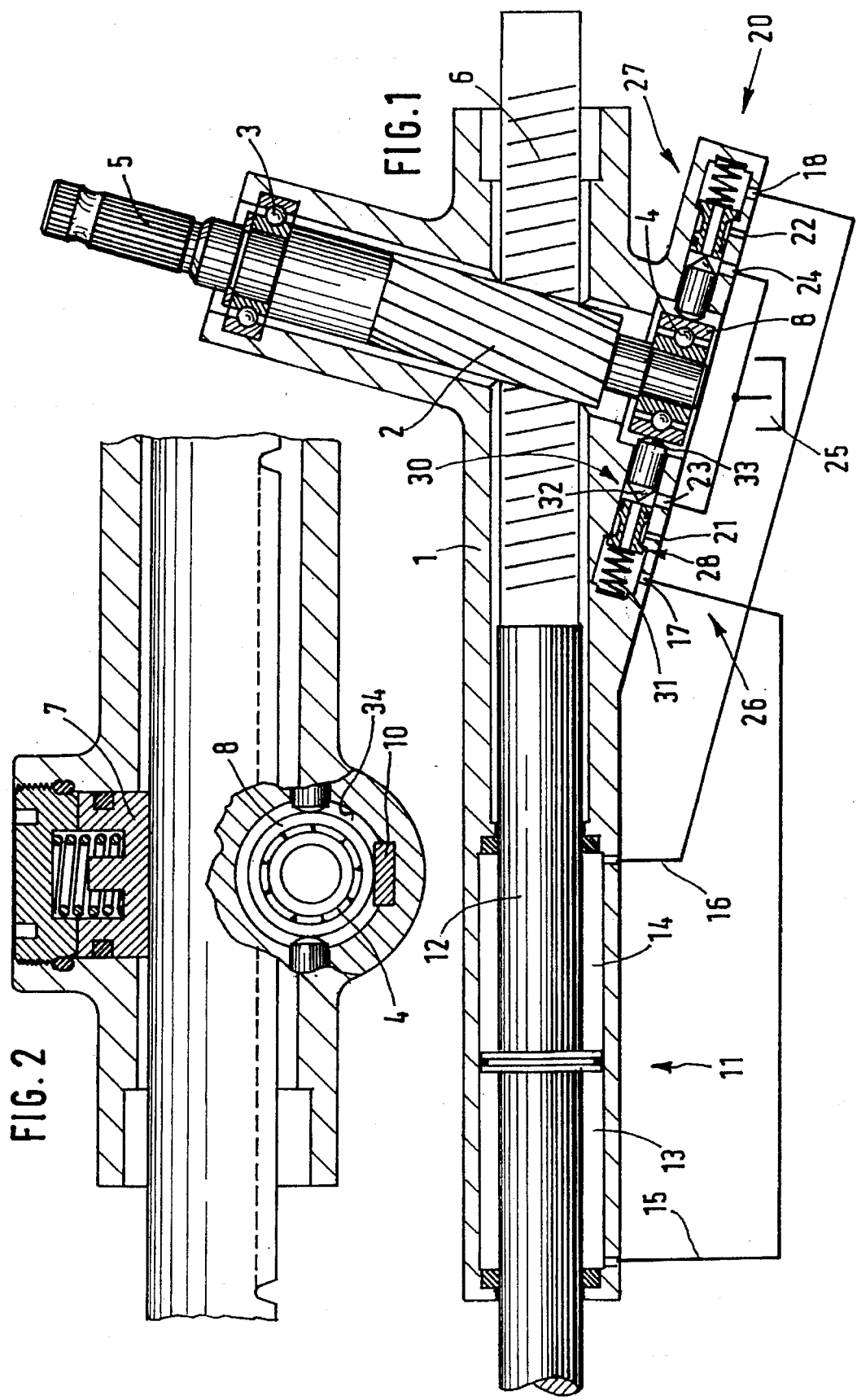

5,509,493

CONTROL DEVICE FOR STEERING-RACK EQUIPPED AUXILIARY POWER STEERING

BACKGROUND OF THE INVENTION

1. Field of the Invention

This invention relates to a steering-rack-equipped auxiliary power steering, especially for motor vehicles. In this kind of auxiliary power steering, a pinion is positioned rotatably in a steering housing. A steering rack is guided in an axially movable fashion in the steering housing and is maintained so as to engage the pinion by means of a spring-loaded thrust piece. A servomotor is used to support the auxiliary power steering; this servomotor is connected with the steering rod in a driving manner. A control device for steering a pressure agent to and from the servomotor can be adjusted as a function of a movement of the pinion.

2. Description of the Prior Art

Such a steering-rack-equipped auxiliary power steering is known from EP-B1-01 92 641. In this design, tile oblique gearing of the pinion generates a force component upon the pinion in an axial direction so that the pinion will be adjustable in an axial direction. The control valves can be adjusted by means of this axial shifting of the pinion.

To ensure perfect operation of the control valves, the slope angle of the pinion should, if at all possible, be more than 35 degrees. In that way, the choice of pinion gearing is heavily restricted. The activation of the control valves can be impaired in that the lateral forces that act upon the steering rack are braced upon the pinion and call thus increase the friction for the axial shifting of the pinion. The known steering-rack-equipped auxiliary power steering can then not be used when only a limited structural space is available in the area of the diameter of the pinion housing.

The purpose of the invention is to prevent the described shortcomings without any additional design effort. In particular, it should be possible to use pinions with differing helix angles [slope angles], in other words, also with helix angles of less than 35 degrees.

SUMMARY OF THE INVENTION

This problem is solved by the steering-rack-equipped auxiliary power steering. The solution is accomplished particularly inasmuch as the pinion is positioned swingably on a fixed bearing and a movable bearing. Here, the control device is made in the form of two control valves that are arranged in the area of the movable bearing. The control valves have valve seats whose axes are positioned essentially perpendicularly to the axis of the pinion. This means that to activate the control valve, one does not make use of the axial forces acting upon the pinion, but instead, one uses the lateral forces. If one turns the steering spindle, then the gearing of the pinion will first roll off in the gearing of the still fixed steering rack and will thus move the bearing journal of the pinion that is guided in the loose bearing, so that one of the control valves will be adjusted. If one uses seat valves in the control valves, then very small movements of the pinion will suffice to activate and control the control valves. By means of these minimal control paths and the connected minor movements of the pinion in its movable bearing, it is possible to position the pinion on one side, for example, on the side of the steering spindle with a fixed bearing. The swing angle of the pinion is then so small that the set within the gearing remains within the permissible range.

Practical and advantageous versions of the invention are given in the subclaims. But the invention is not confined to the combination of features given in the claims. The expert will find additional meaningful combination possibilities of claims and individual claim features from the problem statement.

The invention will be described in greater detail below with the help of a practical example illustrated in the drawing.

BRIEF DESCRIPTION OF THE DRAWINGS

FIG. 1 is a longitudinal profile through a steering-rack-equipped auxiliary power steering according to the invention;

FIG. 2 is a partial cross section through the steering-rack-equipped auxiliary power steering in FIG. 1 in the area of the pinion.

DESCRIPTION OF THE PREFERRED EMBODIMENTS

A pinion 2 is rotatably positioned in two bearings 3 and 4 in a steering housing. At one of its ends, pinion 2 has a steering spindle connection 5 for connection to a steering member, for example, a steering spindle—not shown—with a manual steering wheel. One of the bearings, preferably bearing 3, which lies in the vicinity of steering spindle connection 5, is made as a fixed bearing. The other bearing, preferably bearing 4, that faces away from the steering spindle connection 5, is made as a movable bearing.

Via its gearing, pinion 2 engages a steering rack 6 that is guided in steering housing 1 in an axially movable fashion. Steering rack 6 is pressed with the help of a spring-loaded thrust piece 7 against the gearing of pinion 2 in the known manner. Pinion 2 is braced on one of its sides in fixed bearing 3, and on its other side, it is supported via movable bearing 4 in steering housing 1. Preferably, a little pressure plate 10 is located between the outer ring 8 of movable bearing 4 and the steering housing 1; this little pressure plate is firmly connected with steering housing 1. Little pressure plate 10 serves to facilitate a low-friction and low-wear movement of movable bearing 4. Outer ring 8 of movable bearing 4 can roll off on little pressure plate 10. But because the movement of the lower part of pinion 2 and of movable bearing 4 is very small—as will be explained in the further course of the description—one can possibly dispense with the little pressure plate 10.

A servomotor 11—whose piston rod 12 is firmly connected with steering rack 6—serves for auxiliary power support. Servomotor 11 contains 2 similar compartments 13 and 14 that are connected via working lines 15 and 16 with two cylinder connections 17 and 18 of a control device 20. Control device 20 furthermore reveals two supply connections 21 and 22 to which is connected a pressure medium source, not shown. A container 25 is connected to two return connections 23 and 24.

Control device 20 contains two control valves 26 and 27 that are made as seat valves and whose axes are positioned essentially perpendicularly to the axis of pinion 2. The two control valves 26 and 27 are arranged in the area of loose bearing 4.

The two control valves 26 and 27 are made essentially identical. Each control valve 26, 27 contains an inlet seat valve 28 and an outlet seat valve 30. Inlet seat valve 28 is kept closed when the steering is in a neutral position by the force of a spring 31. Outlet seat valve 30 is opened in the neutral position. As a result, cylinder compartments 13 and 14 are connected with the return to the container 25. A closing body 32 of each outlet seat valve 30 has a valve plunger 33 that rests against the outer ring 8 of movable bearing 4.

The activation paths [travel] of control valves 26 and 27 are illustrated in an exaggerated large fashion in the drawing for clarity. In reality, the control paths [distances] amount to only a few tenths of a millimeter. The diameter of a borehole 34 of steering housing 1, in which is arranged loose bearing 4, therefore is only slightly larger than the outside diameter of outside ring 8 of movable bearing 4. Little pressure plate 10 can therefore possibly be omitted.

The operation of the steering-rack-equipped auxiliary power steering according to the invention will be described below: if, by means of a rotation of the manual steering wheel—not shown—the pinion 2, for example, is turned toward the right, then the gearing of pinion 2, first of all rolls off in the gearing of steering rack 6, which is momentarily still fixed in position. As a result, pinion 2 is swung around fixed bearing 3 by a very small angle. Movable bearing 4 is shifted to the left. This movement is transmitted via the outer ring 8 of movable bearing 4 upon valve plunger 33 and thus upon closing body 32 of outlet seat valve 30. Closing body 30 is moved to the left until such time as the connection from the working line 15 to container 25 is interrupted. Upon a further shift of closing body 30, the closing body of inlet seat value 28 is moved to the left against the force of spring 31. As a result, the link from supply connection 21 via working line 15 to cylinder compartment 13 is opened. A pressure is built up in cylinder compartment 13 that shifts the steering rack 6 to the right according to the movement upon the manual steering wheel. At the same time, a pressure force results upon the closing body of inlet seat valve 28 in the closing direction and a balance is generated between the pressure in the cylinder compartment 13 and the torque on the manual steering wheel.

In case of opposite direction of rotation, the operation takes place accordingly as a result of the symmetrical structure of control valves 26 and 27.

| References | |
| --- | --- |
| 1 | Steering housing |
| 2 | Pinion |
| 3 | Bearing (fixed bearing) |
| 4 | Bearing (loose bearing) |
| 5 | Steering spindle connection |
| 6 | Steering rack |
| 7 | Thrust piece |
| 8 | Outer ring |
| 9 | — |
| 10 | Little pressure plate |
| 11 | Servomotor |
| 12 | Piston rod |
| 13 | Cylinder compartment |
| 14 | Cylinder compartment |
| 15 | Working line |
| 16 | Working line |
| 17 | Cylinder connection |
| 18 | Cylinder connection |
| 19 | — |
| 20 | Control device |
| 21 | Supply connection |
| 22 | Supply connection |
| 23 | Return connection |
| 24 | Return connection |
| 25 | Container |
| 26 | Control valve |
| 27 | Control valve |
| 28 | Inlet seat valve |
| 29 | — |
| 30 | Outlet seat valve |
| 31 | Spring |
| 32 | Closing body |
| 33 | Valve plunger |
| 34 | Borehole |

We claim:

1. Steering-rack-equipped auxiliary power steering suitable for use in motor vehicles including a steering housing, a pinion having an axis which is connected to a manual steering wheel spindle and positioned rotatably in the steering housing, a steering rack mounted for axial movement in the steering housing and positioned in engagement with the pinion by a spring-loaded thrust piece, a control device responsive to the movement of the pinion, and a servomotor operated by the control device and associated with the steering rack to provide auxiliary power support to the steering rack, wherein the improvement comprises: providing a fixed bearing and a movable bearing in the steering housing, swingably positioning the pinion in the fixed bearing and the movable bearing such that rotation of the pinion causes movement of the movable bearing, wherein the control device includes two control seat valves mounted in said steering housing, each control seat valve having an axis which is substantially perpendicular to the axis of the pinion, and wherein the movable bearing is operably engaged with the control seat valves such that the movement of the movable bearing opens and closes the control seat valves to operate the servomotor.

2. Steering-rack-equipped auxiliary power steering according to claim 1, wherein the movable bearing has an axis and the movable bearing is movable perpendicular to its axis only in the direction of the axes of the control seat valves and said movable bearing is movably guided in the steering housing on a side of the steering rack opposite the thrust piece.

3. Steering-rack-equipped auxiliary power steering according to claim 2, wherein each control seat valve comprises an inlet seat valve and an outlet seat valve.

4. Steering-rack-equipped auxiliary power steering according to claim 3, wherein the inlet seat valve is closed when the manual steering wheel spindle is in a neutral position for steering straight ahead, and the outlet set valve is open when the manual steering wheel spindle is in the neutral position.

5. Steering-rack-equipped auxiliary power steering according to claim 4, wherein each outlet seat valve includes a closing body which comprises a valve plunger which rests against an outer ring of the movable bearing.

6. Steering-rack-equipped auxiliary power steering according to claim 5, wherein the rotation of the pinion and consequent movement of the movable bearing first closes the outlet seat valve and further movement of the movable bearing subsequently opens the inlet seat valve.

* * * * *